UNITED STATES PATENT OFFICE 2,620,334

PROCESS OF EXTRACTION FROM IRISH MOSS

Ernst K. Nielsen, Lake Villa, and Nicholas R. Pellicani, Freeport, Ill., assignors to Kraft Foods Company, Chicago, Ill., a corporation of Delaware No Drawing. Application December 8, 1949,
Serial No. 131,912

11 Claims. (Cl. 260—209)

The present invention relates, in general, to extracts of the sea plant known as Irish moss and, in particular, to an improved extract of Irish moss and to a method of producing the improved extract.

Irish moss is a sea plant known by the botanical names of *Chondrus crispus* or *Gigartina mamillus* or more commonly designated as Carragheen, Perl moss, rock salt moss, and killeen pigwrack. Irish moss is harvested along the coast of the British Isles, northern Europe, New England, and Nova Scotia, and has been used for many years in the preparation of pharmaceuticals and food products.

Irish moss is usually employed in the form of a concentrate or extract which is obtained by leaching the useful materials from the moss with hot water, the leaching water then being separated from the solid residue and evaporated to form an extract. The heretofore known commercial Irish moss extracts have been characterized by fairly high viscosities and gel strengths in aqueous dispersions and by fair suspending properties. For example, a one per cent aqueous dispersion of a typical commercial extract exhibits a viscosity of about 70 centipoises at 98° F. (measured by a Brookfield viscosimeter), this same material having a gel strength of from about 70-90 grams per square centimeter at 50° F. (measured by a modified Saare-Martens disk method). The commercial extract referred to above has a suspending power of about .25, suspending power for the purpose of this application being the least number of grams of the extract which will maintain 5.5 grams of cocoa in suspension in 500 grams of milk at 50° F.

While the previously known Irish moss extracts have had extensive use as stabilizers and thickeners for dairy, food, and pharmaceutical products, the extracts have not been entirely satisfactory for many purposes since the amount of the extract needed to obtain the desired viscosity or suspending power often causes the product to gel or "set-up." For example, in preparing a chocolate milk drink, the amount of commercial Irish moss extract needed to suspend the cocoa in the milk is often so great that the milk "sets-up" and forms thick gelatinous masses which are unpalatable and which therefore affect the merchantability of the product. Irish moss extract has been used as a thickener in liquid dentifrices, artificial syrups, lotions, hair shampoos, tooth pastes, and other products where it is necessary to obtain some particular viscosity, but the use of the extract in these products has also been restricted due to its property of gelling or "setting-up."

Accordingly, the principal object of this invention is the production of an Irish moss extract which exhibits a high viscosity in aqueous dispersions, which possesses substantially no gel producing capacity, and which is capable of maintaining a suspension of solid or fibrous materials in aqueous dispersions.

In the usual process for preparing Irish moss extract the moss which may or may not be dried is ground in a hammer mill and is placed in a large volume of water, e. g. about 200 pounds of moss to about 6000 pounds of water, and the mixture is cooked at about boiling temperature for about one hour. The vegetable fibers are then separated from the cooked mixture and the remaining liquid is then dried to produce the commercial Irish moss extract whose properties have been described. The drying may be effected by evaporating the water from the liquid or by the usual alcohol extraction and drying procedure.

We have discovered that a more uniform extract may be produced, that the viscosity and suspending strength of the extract may be greatly increased, and that the gel forming tendency of the extract may be greatly decreased, by obtaining the extract from dried Irish moss which is soaked in an aqueous solution containing sodium ion prior to the step of heating the moss in the extraction or leaching process, the sodium ion being supplied from a sodium salt. The viscosity of 1 per cent dispersions of certain of the improved extracts made in accordance with the procedure of the invention is as much as 600 per cent greater than a similar dispersion of an extract made by the conventional procedure. Unexpectedly, the gel forming tendencies of our improved, high viscosity extracts are substantially eliminated. Thus, the improved extract may be used as a thickening agent in relatively large amounts without causing the thickened material to "set-up" or gel.

In general, Irish moss extract having high viscosity and low gel strength may be produced by soaking dried Irish moss, e. g. the so-called "black" or unbleached Irish moss or the bleached Irish moss of commerce, for a short period of time, e. g. about 15 minutes, in a dilute aqueous solution containing a sodium salt, draining the salt solution from the moss, cooking the drained moss in water to leach the valuable constituents therefrom, then separating the fibrous materials from the liquid, and removing the water from the liquid to produce an extract. Sodium salts which may be employed in the process include both inorganic and organic salts such as sodium chloride, sodium carbonate, sodium iodide, sodium bicarbonate, sodium phosphate, sodium nitrate, sodium acetate, and sodium citrate. In the case of sodium chloride the dilute solution desirably contains from about 0.5 to 10 per cent by weight of salt and generally the other salts are used in concentrations which supply sodium ion in an amount equivalent to that of a .5 to 10 per cent by weight sodium chloride solution. Alkaline salts such as sodium carbonate, sodium phosphate, etc., are ordinarily employed in lesser amounts than the more neutral salts since solutions of high pH value may have a detrimental effect upon the product. The optimum concentration for any one salt may be readily determined by preliminary experimental tests. In commercial operations, however, use of sodium chloride is preferred since this salt is the most readily available, is inexpensive, and, in addition, produces pronounced results on the moss being treated.

The results of the sodium ion soak prior to processing may be even further enhanced by rinsing the dried moss in clear water prior to the soak, after the soak, or both before and after the soak. When the preferred procedure of the invention is followed, i. e. rinsing the dried moss in water, soaking the rinsed moss for from about 15 minutes to about 75 minutes in an aqueous solution of a sodium salt, rinsing the soaked moss with clear water, suspending the rinsed moss in water and extracting the valuable constituents from moss in the usual manner, the viscosity of the extract is increased over that observed when a salt soak alone is employed and the gel strength or gel forming tendency is substantially eliminated. Soaking the moss for prolonged periods in the salt solution will also affect the properties of the extract but prolonged soaking periods show little or no advantage over soaks of from 15 to 75 minutes.

The following specific examples will serve to illustrate various procedures in accordance with this invention.

*Example I*

Irish moss sea plants which had previously been air dried, without bleaching, to produce the "black moss" of commerce, were passed through a hammer mill which comminuted the plant particles to about 10 to 20 mesh. The comminuted plant particles were then passed over a screen to remove the fines which consist primarily of sand, grit, broken-up mussel shells, and the like, which are present in the moss as harvested.

A portion of the cleaned moss weighing 1.375 pounds was suspended in 29 pounds of a one per cent, by weight, aqueous solution of sodium chloride. The moss was soaked in this salt solution for about one hour at room temperature (about 70° F.), and at the end of this period the salt solution was drained from the moss. Enough tap water was added to the drained moss to bring the total water present to about 50 pounds (fresh water plus the water retained by the moss from the salt solution). The mixture of moss and tap water was rapidly heated to 205° F. and was then cooked for 75 minutes at a temperature of between 200 and 205° F. At the end of the cooking period, about 3.5 pounds of diatomaceous earth filter aid was added to the hot cooked mixture which was then filtered while hot in a plate and frame filter press. A parting agent, glyceryl monolaurate, was added to the filtrate in amounts representing about 0.9 gram for each pound of filtrate. The filtrate was then dried on a roll drier to about six per cent moisture, the rolls on the drier being heated by saturated steam under a pressure of about 60 pounds per square inch. The dried filtrate comprised the extract.

A one gram portion of the extract prepared as described above was dispersed in 99 grams of water to produce a 1 per cent aqueous dispersion. The viscosity of this dispersion at 98° F., as measured on a Brookfield viscosimeter, was 230 centipoises. Another portion of the extract was dispersed in water to produce a 2 per cent aqueous dispersion, and this dispersion was tested for gel strength by the modified Saare-Martens disk method.

When determining the gel strength by the modified Saare-Martens disk method the two per cent aqueous dispersion, by weight, is heated to from 175–185° F. and poured into a wide mouthed container such as a beaker. A test surface having an area of one square centimeter and having a supporting hook attached thereto, is suspended in the dispersion. The dispersion in the container is then cooled and aged for about 12 hours. The container is then placed in a water bath held at 50° F. for one hour to temper the gel. The gel strength is then measured by the least number of grams required to break the test surface free from its position in the gel. The 2 per cent dispersion of the example had a gel strength of 20 grams per square centimeter.

A third portion of the extract was employed as a suspending agent in dispersing 5.5 grams of cocoa powder in 500 grams of milk at 140–160° F. followed by cooling (a determination of the suspending or stabilizing strength of the extract). In this latter test only .20 gram of the extract were required to effect complete suspension of the cocoa as in normal commercial practice.

An extract of the same batch of dried moss produced under the conditions set forth above but with the omission of the step of soaking the moss in the salt solution prior to cooking, was dispersed in water to produce test dispersions. A one per cent dispersion showed a viscosity of 72 centipoises (98° F., Brookfield), a two per cent dispersion had a gel strength of 129 grams per square centimeter, and .25 gram of the extract were required to stabilize the standard cocoa-milk suspension.

*Example II*

Another 1.375 pound portion of the air dried moss of Example I was rinsed in 29 pounds of tap water at room temperature (about 70° F.) for about 5 minutes with occasional stirring and the rinse water was decanted. Enough one per cent, by weight, aqueous sodium chloride solution at room temperature (about 70° F.) was then added to the rinsed moss to bring the total amount of solution present to about 29 pounds (a total of the water absorbed by the moss and the salt solution present). The moss was soaked in this sodium chloride solution for 1 hour with occasional stirring, and when the 1 hour soak was completed, the sodium chloride solution was drained from the moss. Enough tap water was then added to the moss to bring the total weight of water to about 29 pounds, and the moss was stirred with this water for about 5 minutes to remove as much of the sodium chloride as possible. This water was then drained from the moss and enough fresh water was added to the moss to bring the total weight of water up to 50 pounds. This mixture was then heated rapidly to 205° F., was cooked, filtered, and dried in accordance with the procedure set forth in Example I.

A portion of the extract produced by the method of this Example was dispersed in water to produce test dispersions. A one per cent dispersion exhibited a viscosity of 580 centipoises (98° F. Brookfield), a two per cent dispersion had a gel strength of 8 grams per square centimeter, and .18 gram of the extract were required to stabilize the standard cocoa-milk suspension.

*Example III*

Another portion of the cleaned moss of Example I was treated as in Example II with the exception that a 2 per cent, by weight, solution of sodium bicarbonate was employed in place of the one per cent sodium chloride solution of that example. The extract was dispersed in water to produce test dispersions. A one per cent dispersion exhibited a viscosity of 783 centipoises (98° F. Brookfield), a two per cent dispersion had a gel strength of zero grams per square centimeter, and .17 gram of the extract were required to stabilize the standard cocoa-milk suspension.

*Example IV*

Another portion of the cleaned moss of Example I was treated as in Example II with the exception that a 4 per cent, by weight, solution of sodium chloride was used in place of the one per cent solution of that example. The extract was dispersed in water to produce test dispersions. A one per cent dispersion exhibited a viscosity of 478 centipoises (98° F. Brookfield), a two per cent dispersion had a gel strength of zero grams, and .18 gram of the extract were required to stabilize the standard cocoa-milk suspension.

It will be seen from an examination of the properties of the Irish moss extracts of the above specific examples that the viscosity, the gel forming tendencies, and the stabilizing action of the moss extract are greatly affected by the sodium ion soak prior to the cooking operation. When an extract made in accordance with the procedure of the invention is employed as a thickener or suspending agent in a food product, relatively large amounts may be employed without danger of gel formation.

The time of the salt soaking step may be varied to suit operating conditions. However, it will be found that the moss should be held at least about 15 minutes and preferably between about 30 and 60 minutes. Ordinarily, there is no material advantage in holding the moss in the salt solution for over 60 minutes and, in many instances, some of the properties of the moss extract may be damaged by an excessive soaking period. For example, a ten per cent sodium chloride solution, in 90 minutes ordinarily reduces the viscosity of the extract somewhat rather than increasing it, however, the gel strength will be reduced to a zero value. In commercial operation, the material is soaked between about 30 and about 60 minutes in a sodium chloride solution containing from .5 to 6 per cent by weight of sodium chloride. Optimum results are produced by a 60 minute soak with a 1 per cent sodium chloride solution.

The length of time required for the clear water rinses before and after the salt soak may be of substantially any duration. The rinse may constitute merely running fresh water over the moss, or the moss may be held in the rinse water for periods of as long as 30 minutes. However, extensive operations have shown that a 5 minute rinse both before and after a salt water soak improves the separation of the material from the final drying rolls and greatly enhances the properties of the finished product.

The temperatures at which the salt solution and the rinse water are maintained is not critical but soaking and rinsing temperatures of over about 95° F. decrease the yield of the extract in the leaching operation. Desirably, the rinsing and soaking are carried out at about room temperature or below.

The extracting or leaching procedures may be those normally employed in the manufacture of Irish moss extracts. The moss is suspended in from about 20 to 50 times its weight of water and the cooking temperatures and times may be varied considerably to suit manufacturing conditions. Normally, however, cooking times of from about 40 minutes to 120 minutes and temperatures in the range of from about 200 to 210° F. have been found satisfactory.

Various features of the invention which are believed to be new are set forth in the appended claims.

We claim:

1. The method of producing an extract of Irish moss which comprises the steps of soaking dried Irish moss sea plants in an aqueous solution of a sodium salt, the solution being substantially free from contaminating ions and the amount of sodium ion available in the salt solution being equivalent to that present in a .5 to 10 per cent, by weight, aqueous solution of sodium chloride, draining the solution from the moss, cooking the drained moss in water to leach the valuable constituents from the moss, separating the liquid from the solid residue, and removing water from the liquid to produce the extract.

2. The method of producing an extract of Irish moss which comprises the steps of soaking dried Irish moss sea plants in an aqueous solution of a sodium salt, the solution being substantially free from contaminating ions and the amount of sodium ion available in the salt solution being equivalent to that present in a .5 to 10 per cent, by weight, aqueous solution of sodium chloride, draining the solution from the moss, rinsing the drained moss in fresh water, cooking the rinsed moss in water to leach the valuable constituents from the moss, separating the liquid from the cooked moss, and removing water from the liquid to produce the extract.

3. The method of producing an extract of Irish moss which comprises the steps of rinsing dried Irish moss sea plants in fresh water, soaking the rinsed Irish moss in an aqueous solution of a sodium salt, the solution being substantially free from contaminating ions and the amount of sodium ion available in the salt solution being equivalent to that present in a .5 to 10 percent, by weight, aqueous solution of sodium chloride, draining the solution from the moss, cooking the drained moss in water to leach the valuable constitutents from the moss, separating the liquid from the cooked moss, and removing water from the liquid to produce the extract.

4. The method of producing an extract of Irish moss which comprises the steps of rinsing dried Irish moss sea plants in fresh water, soaking the rinsed Irish moss in an aqueous solution of a sodium salt, the amount of sodium ion available in the salt solution being equivalent to that present in a .5 to 10 percent, by weight, aqueous solution of sodium chloride, draining the solution from the moss, rinsing the drained moss in fresh water, cooking the rinsed moss in water to leach the valuable constituents from the moss, separating the liquid from the cooked moss, and removing water from the liquid to produce the extract.

5. The method of producing an extract of Irish moss which comprises the steps of soaking dried Irish moss sea plants in an aqueous solution of a sodium salt for over about 15 minutes, the amount of sodium ion available in the salt solution being equivalent to that present in a .5 to 10 per cent, by weight, aqueous solution of sodium chloride, draining the salt solution from the moss, cooking the drained moss in water to leach the valuable constituents from the moss, separating the liquid from the cooked moss, and drying the liquid to produce the extract.

6. The method of producing an extract of Irish moss which comprises the steps of rinsing dried Irish moss sea plants in fresh water, soaking the rinsed Irish moss in an aqueous solution of a sodium salt for over about 15 minutes, the amount of sodium ion available in the salt solution being equivalent to that present in a .5 to 10 per cent, by weight, aqueous solution of sodium chloride, draining the salt solution from the moss, rinsing the drained moss in water, cooking the rinsed moss in water to leach the valuable constituents from the moss, separating the liquid from the cooked moss, and drying the liquid to produce the extract.

7. The method of producing an extract of Irish moss which comprises the steps of soaking dried Irish moss sea plants in an aqueous solution of a sodium salt for from about 15 to about 75 minutes at a temperature of less than about 95° F., the amount of sodium ion available in the salt solution being equivalent to that present in a .5 to 10 per cent, by weight, aqueous solution of sodium chloride, draining the salt solution from the moss, cooking the drained moss in water to leach the valuable constituents from the moss, separating the liquid from the cooked moss, and drying the liquid to produce the extract.

8. The method of producing an extract of Irish moss which comprises the steps of rinsing dried Irish moss sea plants in fresh water, soaking the rinsed Irish moss in an aqueous solution of a sodium salt for from between about 15 and 75 minutes at a temperature of less than about 95° F., the amount of sodium ion available in the salt solution being equivalent to that present in a .5 to 10 per cent, by weight, aqueous solution of sodium chloride, draining the salt solution from the moss, rinsing the drained moss in water, cooking the rinsed moss in water to leach the valuable constituents from the moss, separating the liquid from the cooked moss, and drying the liquid to produce the extract.

9. The process of claim 7 wherein the sodium salt is sodium chloride.

10. The process of claim 8 wherein the sodium salt is sodium chloride.

11. The method of producing an extract of Irish moss which comprises the steps of rinsing dried Irish moss sea plants in fresh water at a temperature of less than about 95° F., soaking the rinsed Irish moss in a 1 per cent, by weight, aqueous solution of sodium chloride for about 60 minutes at a temperature of less than about 95° F., separating the soaked moss from the salt solution, rinsing the separated moss in water at a temperature of less than about 95° F., cooking the suspended moss in water to leach the valuable constituents from the moss, separating the liquid from the cooked moss, and drying the liquid to produce the extract.

ERNST K. NIELSEN.
NICHOLAS R. PELLICANI.

REFERENCES CITED

The following references are of record in the file of this patent:

UNITED STATES PATENTS

| Number | Name | Date |
|---|---|---|
| 2,427,594 | Frieden et al. | Sept. 16, 1947 |

OTHER REFERENCES

Lawall et al., J. Am. Pharm. Assoc., v. 21 (1932), page 1150.

Mantell, "The Water-Soluble Gums," 1947, pages 97–104, 8 pages.